June 17, 1941.  W. J. CLEMENTS  2,245,761
MOTOR AND FAN ASSEMBLIES FOR VACUUM CLEANERS
Original Filed July 1, 1939  2 Sheets-Sheet 1
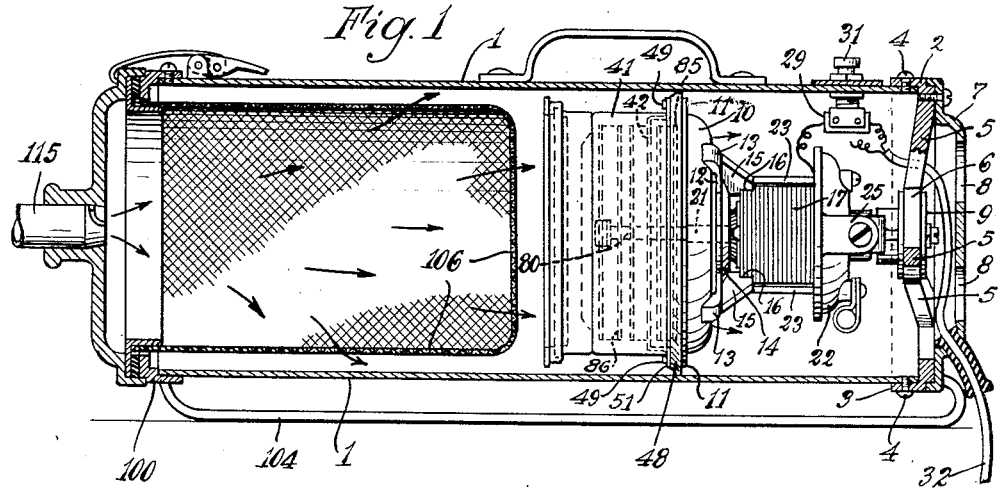
Inventor
William J. Clements
Attorneys.

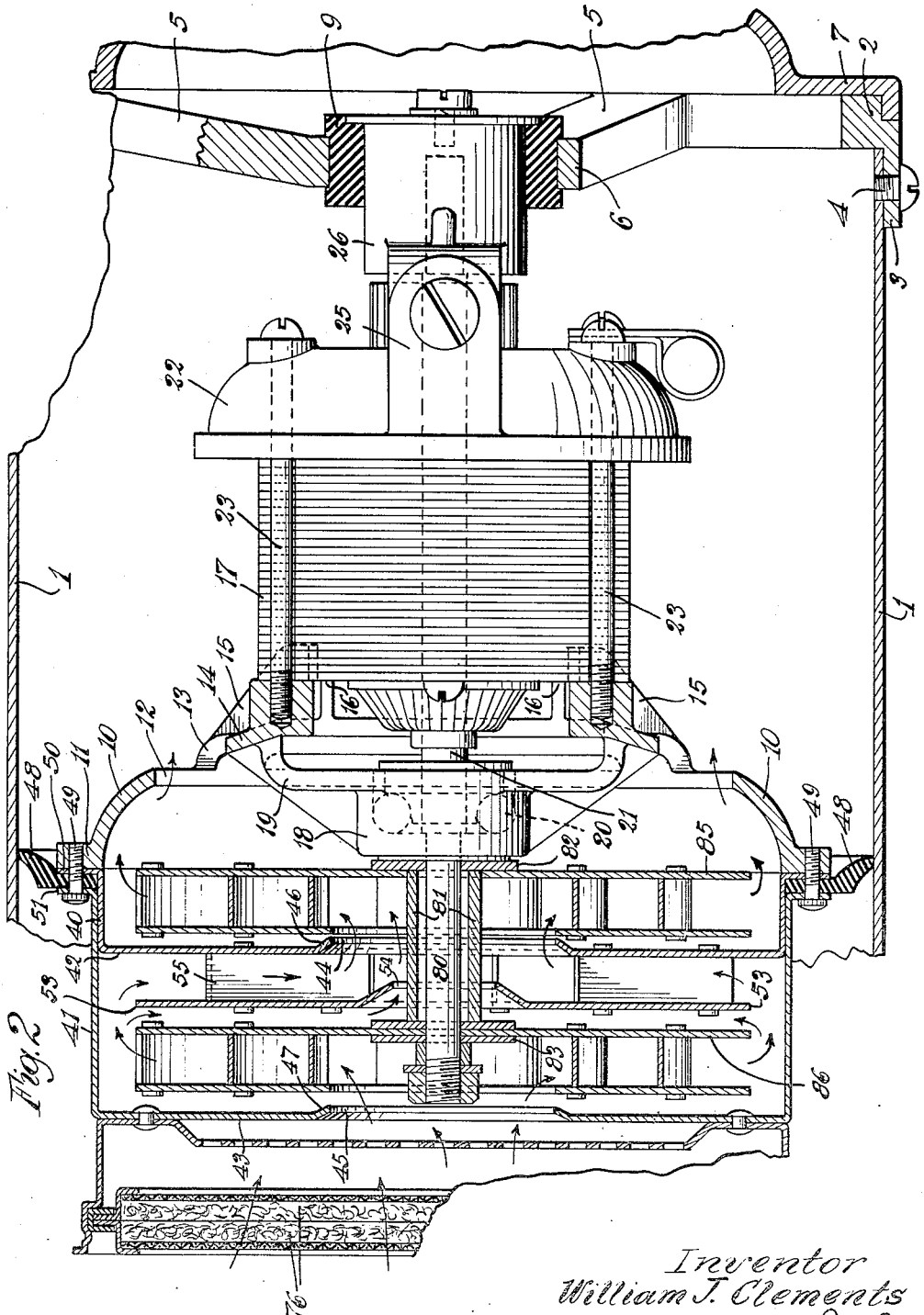

Patented June 17, 1941

2,245,761

UNITED STATES PATENT OFFICE 2,245,761

MOTOR AND FAN ASSEMBLIES FOR VACUUM CLEANERS

William J. Clements, Chicago, Ill., assignor to Clements Mfg. Co., Chicago, Ill., a corporation of Illinois Original application July 1, 1939, Serial No. 282,372. Divided and this application June 13, 1940, Serial No. 340,231

9 Claims. (Cl. 172—36)

My invention relates to an improvement in motor and fan assemblies for vacuum cleaners.

One purpose of the invention is to provide a motor particularly adaptable for association with a fan unit in the so-called tank type cleaners.

Another purpose is the provision of an improved motor structure adapted for efficient cooling of the motor.

Another purpose is the provision of an improved motor assembly adapted for readily demountable support within a generally tubular housing, such as is constituted by the housing of a tank type cleaner.

The present application is a division of my co-pending application Serial Number 282,372, filed in the United States Patent Office on July 1, 1939.

Other purposes will appear from time to time in the course of the specification and claims.

I illustrate my invention more or less diagrammatically in the accompanying drawings wherein:

Fig. 1 is a longitudinal section of a cleaner casing, illustrating my motor in position;

Fig. 2 is a sectional view on an enlarged scale of the motor and associated parts; and Fig. 3 is a rear elevation of a tank type cleaner illustrating my motor in position.

Like parts are indicated by like symbols throughout the specification and drawings.

Referring to the drawings, 1 generally indicates a tubular or cylindrical housing, which has at one end a ring 2, including a flange portion 3 which fits about the exterior of one end of the housing 1. 4 indicates any suitable screws or other securing means whereby the ring may be secured to the housing. 5 indicates a spider structure extending generally radially inwardly from the ring and supporting the inner hub 6, herein shown as unitary with the spider and ring.

7 is any suitable removable covering or cap having any suitable air outlet apertures 8. 9 is a ring of rubber or the like set within a central aperture of the hub 6. 10 generally indicates a shield or ring having a circumferential flange 11 and a central air aperture 12. Extending inwardly from the inner edge of the ring 10 are supports 13, which carry an inner ring 14, which extend inwardly in the form of ribs, as at 15, and are provided with ledge abutments 16, which receive the motor field laminations 17. The bearing sleeve 18 is mounted upon inwardly extending arms 19 unitary with the above described structure. Any suitable anti-friction bearings 20 may be mounted in the sleeve 18 to support the motor shaft 21, which carries any suitable motor armature rotating within the field laminations 17.

22 is an abutment ring abutting against the opposite end of the group of field laminations 17. Any suitable means, for example bolts 23, may be employed for clamping it and for thereby holding the laminations 17 against the abutment ledges 16 of the members 15. The ring 22 also is adapted to support any suitable brushes as upon the bridge 25, which brushes cooperate with the commutator of the motor. 26 is a generally cylindrical outer extension of the bridge 25, which penetrates the central aperture within the rubber sleeve 9.

Any suitable switch structure may be used, generally indicated as 28, 29, the details of which do not of themselves form part of the present invention. I illustrate, however, two separate outwardly extending manually manipulatable switch members 30, 31. 32 indicates any suitable conductive line extending to any suitable source of electric power not herein shown.

Mounted upon the flange 11 of the ring 10 is a fan housing structure, which includes two nesting cylindrical housing members 40, 41, carrying inwardly extending partition walls 42, 43, each centrally apertured as at 44, 45, the central aperture being bordered by an inturned lip 46, 47. The two members 40, 41 are secured as shown in Fig. 2. They provide a fan housing separated into two main compartments. In order to support the ring 10 for ready endwise removal from the housing 1, I provide a yielding compressible ring 48 of rubber or the like. Unitary locking means, such as the screws 49, may be employed for locking the rubber ring 48 between the flanges 50, 51, of the members 40 and 41, respectively.

The motor shaft 21 is shown as having an extension 80 into the fan housing. It may be positioned in relation to the bearing 20 in any suitable manner. I illustrate a hub structure, including a sleeve 81, with spacing washers 82, 83, and 84. Mounted on the shaft extension 80 and spaced by the sleeve 81, are fan discs 85, 86.

It will be observed, as in Fig. 2, that, in response to the rotation of the motor and the fan, air is drawn inwardly in the direction of the arrows, and passes inwardly along the fixed baffles 55, through the central aperture 54, and also about the edge of the baffle 53, and is then directed outwardly by the second fan. Air is deflected by the ring 10 and passes about the above described motor structure, and then through the spider 5 through the air outlet passage 8, thus cooling the motor.

It will be noted that the entire fan and motor assembly can be readily and unitarily removed from the housing 1 by simply releasing the screws 4 and the below described runner structure.

Another ring 100 is mounted at the opposite end of the housing. The rings 2 and 100 are both provided with outwardly extending lugs 101, which may be apertured as at 102 to receive the recurved upbent ends 103 of any suitable runner structures 104. 105 indicates locking set screws in the lugs 101 adapted to lock the runners in place.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I provide a unitary open-ended tubular housing 1, to which the opposite ends of the rings 2 and 100 are applied and from which they may be readily removed if necessary. Air flows inwardly through the hose connection 115 from any suitable suction nozzle not herein shown. This air, filled with dirt, flows into the interior of the bag 106 and is constrained to flow through the fabric or mesh of which the bag is formed, there depositing the dust or dirt which it carries. The air then flows through the filter structure, which includes the fibrous material 76. If desired, any suitable disinfectant may be employed to impregnate the filter structure. The air then flows through the two-stage fan, elsewhere herein described and shown, and thence outwardly about the motor. The entire fan and motor unit may readily be removed from the housing 1 for inspection or repair.

The ring 48 serves as a vibration preventing support for one end of the fan and motor unit, and the other end is supported in the rubber ring 9. However, since the rubber ring 9 is supported upon the ring 2 and its associated spider structure, and since the ring 48 is slidable in relation to the housing 1, the entire motor and fan unit, although readily removable, is also sufficiently supported in a vibration preventing relationship to the housing 1. The motor structure is exposed to the flow of clean air and is efficiently cooled thereby.

I claim:

1. In a motor and fan assembly for vacuum cleaners, a plurality of motor field laminations, a motor rotor, a centrally apertured shield member at one side of said laminations and of substantially greater diameter than said laminations, a spider spanning said aperture, a motor shaft bearing in said spider, a motor bearing and brush supporting frame member opposed to the opposite side of the laminations, brushes mounted thereon, a bearing thereon for the opposite end of the motor shaft, and means for securing said shield and said frame member together about said field laminations, the aperture of said shield member including portions extending radially exteriorly of said laminations.

2. In a motor and fan assembly for vacuum cleaners, a plurality of motor field laminations, a motor rotor, a centrally apertured shield member at one side of said laminations and of substantially greater diameter than said laminations, a spider spanning said aperture, a motor shaft bearing in said spider, a motor bearing and brush supporting frame member opposed to the opposite side of the laminations, brushes mounted thereon, a bearing thereon for the opposite end of the motor shaft, and means for securing said shield and said frame member together about said field laminations, including bolts extending to a shield and frame member located exteriorly of said laminations, the aperture of said shield member including portions extending radially exteriorly of said laminations.

3. In a motor and fan assembly for vacuum cleaners, a plurality of motor field laminations, a motor rotor, a centrally apertured shield member at one side of said laminations, a spider spanning said aperture, a motor shaft bearing in said spider, a motor bearing and brush supporting frame member opposed to the opposite side of the laminations, brushes mounted thereon, a bearing thereon for the opposite end of the motor shaft, means for securing said shield and said frame member together about said field laminations, a generally tubular housing surrounding said motor structure, and means for supporting said shield member and said spider in relation to said housing.

4. In a motor and fan assembly for vacuum cleaners and adapted for insertion in a generally tubular housing, a shield element having air passage means therein, a brush supporting frame member spaced therefrom, a plurality of motor field laminations interposed therebetween and of substantially less diameter than the shield element, the air passage means above the shield element extending radially exteriorly of the outer edges of said laminations, and means for securing said shield and said frame member together about said field laminations.

5. In a motor and fan assembly for vacuum cleaners and adapted for insertion in a generally tubular housing, a shield element having air passage means therein, a brush supporting frame member spaced therefrom, a plurality of motor field laminations interposed therebetween and of substantially less diameter than the shield element, the air passage means above the shield element extending radially exteriorly of the outer edges of said laminations, and means for securing said shield and said frame member together about said field laminations, said field laminations lying in the line of delivery of air through said air passage means in the shield.

6. In a motor and fan assembly for vacuum cleaners and adapted for insertion in a generally tubular housing, a plurality of motor field laminations, a motor rotor, a centrally apertured shield member at one side of said laminations, a spider spanning said aperture, a motor shaft bearing in said spider, a motor bearing and brush supporting frame member opposed to the opposite side of the laminations, brushes mounted thereon, a bearing thereon for the opposite end of the motor shaft, and means for securing said shield and said frame member together about said field laminations, said shield and frame being in supporting connection with said tubular housing.

7. In a motor and fan assembly for vacuum cleaners and adapted for insertion in a generally tubular housing, a shield element having air passage means therein, a brush supporting frame member spaced therefrom, a plurality of motor field laminations interposed therebetween, and of substantially less diameter than the shield element, the air passage means above the shield element extending radially exteriorly to the outer edges of said laminations, means for securing said shield and said frame member together about said field laminations, and a housing surrounding said motor and fan assembly and defining a space radially exterior to said laminations and in communication with the air passage means of said shield element.

8. In a motor and fan assembly for vacuum cleaners and adapted for insertion in a generally tubular housing, a plurality of motor field laminations, a motor rotor, a centrally apertured shield member at one side of said laminations, a spider spanning said aperture, a motor shaft bearing in said spider, a motor bearing and brush supporting frame member opposed to the opposite side of the laminations, brushes mounted thereon, a bearing thereon for the opposite end of the motor shaft, means for securing said shield and said frame member together about said field laminations, and means for securing said brush supporting frame member to one end of the tubular housing.

9. In a motor and fan assembly for vacuum cleaners and adapted for insertion in a generally tubular housing, a plurality of motor field laminations, a motor rotor, a centrally apertured shield member at one side of said laminations, a spider spanning said aperture, a motor shaft bearing in said spider, a motor bearing and brush supporting frame member opposed to the opposite side of the laminations, brushes mounted thereon, a bearing thereon for the opposite end of the motor shaft, means for securing said shield and said frame member together about said field laminations, means for securing said brush supporting frame member to one end of the tubular housing, and means for slidably mounting said shield member within an intermediate part of said tubular housing.

WILLIAM J. CLEMENTS.